United States Patent [19]

Berchielli

[11] 4,368,167

[45] Jan. 11, 1983

[54] METHOD OF MAKING AN ELECTRODE

[75] Inventor: Aldo S. Berchielli, Westerly, R.I.

[73] Assignee: Yardney Electric Corporation, Pawcatuck, Conn.

[21] Appl. No.: 240,683

[22] Filed: Mar. 5, 1981

[51] Int. Cl.$^3$ .............................................. H01M 4/54
[52] U.S. Cl. .................................... 264/104; 429/119; 429/219
[58] Field of Search ................. 264/104; 429/119, 219

[56] References Cited

U.S. PATENT DOCUMENTS 4,118,552 10/1978 Chireau et al. .................... 429/219
4,178,339 12/1979 Powell et al. ...................... 264/104

Primary Examiner—James H. Derrington
Attorney, Agent, or Firm—Donald E. Nist

[57] ABSTRACT

An improved method of making a silver chloride and copper chloride-containing electrode comprises forming a minimum melting point mixture of about 47% by weight of silver chloride and about 53% by weight of cuprous chloride and melting this mixture e.g. at about 255° C., cooling the resulting eutectic, as by casting the same, to form solid pieces, and then grinding the eutectic to a powder of e.g. about 100 mesh. This powdered eutectic is then uniformly mixed with a predetermined desired amount of additional particulate cuprous chloride and the resulting mixture is heated in a mold to above the melting point of the eutectic therein to cause the eutectic to melt and bind the particles of cuprous chloride together. Normally the eutectic is in a concentration of about 10% by weight and the additional particulate cuprous chloride is in a concentration of about 90% by weight of this mixture. The mixture can then be cooled to solidification in the mold to provide a strong electrode in an inexpensive rapid improved manner. The mold can contain, if desired, a metallic grid current collector of copper or the like to which the electrode mixture adheres.

5 Claims, No Drawings

METHOD OF MAKING AN ELECTRODE

BACKGROUND OF THE INVENTION

1. Field of the Invention

The present invention generally relates to electrodes and more particularly to an improved method of making an electrode containing silver chloride and copper chloride.

2. Prior Art

Copper chloride electrodes, specifically cuprous chloride electrodes, have been used successfully in a number of types of electrochemical cells, particularly in conjunction with magnesium electrodes in cells utilizing sea water as the electrolyte. It has been found to be desirable to have a minor concentration of silver chloride in the cuprous chloride electrodes. Conventionally, a powdered mixture of cuprous chloride and silver chloride is formed and then placed in a mold, with or without a copper grid, and then slowly heated to either above the melting point of the silver chloride which is 455° C. or at least to above the melting point of cuprous chloride which is 422° C. In the mass production of electrodes this constitutes a considerable energy expenditure. It would therefore be desirable to provide an improved method of fabricating such electrodes which method would result in a lowered energy expenditure and permit the use of less expensive equipment while still providing strong, well bonded together electrodes.

SUMMARY OF THE INVENTION

The foregoing needs have been satisfied by the improved method of the present invention. The method is substantially as set forth in the Abstract above. Thus, the method comprises forming a minimum melting point eutectic mixture of silver chloride and cuprous chloride. This mixture comprises of about 47% by weight of silver chloride and 53% of cuprous chloride. This mixture is then heated to above the minimum melting point thereof, that is to at least above 255° C., after which the mixture is cooled, solidified and then powdered. This powdered eutectic is then combined with additional cuprous chloride to provide the desired concentration for a cuprous chloride-silver chloride electrode. Normally the final content of silver chloride in the electrode is about 1-10 weight %, with the cuprous chloride comprising the remainder of the electrode. Once the desired mixture is formed it can then be heated in molds to at least the minimum melting point of the eutectic, 255° C., so that only the eutectic melts and acts as a binding matrix to hold the unmelted particles of cuprous chloride together. Once this melting point is reached and melting of the eutectic is accomplished, then the mixture is cooled in the mold to solidification to form the finished electrode. A wire grid of copper or the like may, if desired, be disposed in the mold and serve as the current collector in the electrode.

It will be understood that a large quantity of the minimum melting point eutectic can be made up in advance and ground and then mixed with additional cuprous chloride as needed to make up the electrode-forming mixture. There is an overall saving of a substantial amount of heat energy by following this procedure utilizing the low melting point of the eutectic rather than having to heat the electrode mixture to above the melting point of cuprous chloride, namely 422° C. A substantial further advantage for the present invention is that much less expensive equipment can be used since the temperatures are all below 300° C. in contrast with the equipment needed to heat to well in excess of 400° C.; in fact, a simple oven can accomplish efficient heating to about 275° C., all that is needed, whereas heating in the range of 400° C-500 C. requires a more complicated and expensive furnace. The same is the case for the auxiliary equipment including molds. Further features of the present invention are set forth in the following detailed description.

DETAILED DESCRIPTION

In accordance with the method of the present invention, a mixture of particulate silver chloride and particulate cuprous chloride is formed with the constituents being present in a concentration to provide a minimum melting point eutectic. Thus, in accordance with the present invention, the mixture contains approximately 47% by weight of silver chloride, the remainder being cuprous chloride. The silver chloride and cuprous chloride can be of any suitable mesh size, for example 60 mesh to about 300 mesh. This mixture is then heated to a molten state in a melting pot or the like disposed in an oven at a temperature of at least 255 C., i.e. the temperature necessary to melt the constituents of the eutectic together. The molten eutectic is then cooled to solidification and then ground to a fine powder. To minimize the work necessary to produce the fine powder, it is desirable to cast the molten eutectic into small pieces. It is preferred that the eutectic be ground to small mesh size, for example, finer than 100 U.S. standard mesh, in any suitable grinding equipment which maintains the purity of the eutectic. The powdered eutectic is then mixed with a sufficient additional amount of particulate cuprous chloride to provide in the resulting electrode a concentration of about 1-10% of silver chloride, with the remainder consisting of cuprous chloride. For this purpose, the eutectic powder is added to the additional cuprous chloride to form a concentration of approximately 2-20% of eutectic by total weight of the combined mixtuee. It has been found that at least about 1% by weight of silver chloride is needed in order to improve the electrical characteristics of the cuprous chloride electrode but that amounts in excess of about 10 weight percent of silver chloride do not further increase the performance of the electrode while increasing the overall cost of the electrode because of the high cost of silver. Therefore, the range of about 1-10 weight percent of silver chloride in the electrode is desired. A preferred concentration of the silver chloride is approximately 5 weight percent in the finished electrode, excluding the weight of any current collector included in the electrode. The cuprous chloride preferably has an average particle size of about 100 to 200 U.S. standard mesh.

After the mixture of powdered eutectic and added particulate cuprous chloride is formed, it is uniformly mixed and then is placed in any suitable heating zone. Preferably, it is added to an electrode mold and the mold is heated in an oven to above the melting point of the eutectic but below the melting point of the cuprous chloride. Alternatively, the mixture is heated in a melting pot, etc., in an oven first and when the eutectic has melted it is then poured into an electrode mold and allowed to cool and solidify therein. The molds may, if desired, include current collectors such as screens of copper, nickel, stainless steel or the like. One type of preferred current collector is an expanded copper sheet.

In any event, the mixture in accordance with the method of the present invention is heated to a temperature not in excess of about 300° C. and preferably not in excess of about 275° C. It must be heated to at least the melting point of the eutectic, 255° C., for a time sufficient to cause it to thoroughly melt and form a binding matrix for the unmelted particles of added cuprous chloride in the mixture. While 300° C. is specified as a maximum, that is only from a practical standpoint since some savings in energy and equipment costs will take place whenever the temperature utilized is substantially less than the melting temperature for cuprous chloride, namely about 422° C. It is preferred to utilize a temperature of about 260° C. or so in order to assure full melting of the eutectic in a short period of time while also assuring non-melting of the additional particulate cuprous chloride in the mixture. Such heating need only be carried out for a time sufficient to assure complete melting of the eutectic throughout the mixture. This is usually accomplished within about 10–15 minutes. Thereafter, the mixture can be cooled, as by cooling the mold with cooling coils, etc., or by allowing the mold to cool naturally to room temperature to solidify the mixture into a finished solid strong electrode. The electrode is then removed from the mold and is ready for use. If a current collector is disposed in the mold, normally it is enclosed by the body of cuprous chloride particles held in a matrix of the eutectic. Further features of the invention are indicated in the following specific examples.

EXAMPLE I 47 grams of silver chloride which was 99.95% pure and had a particle size of 60 U.S. standard mesh were mixed with 53 grams of cuprous chloride, technical grade, of 100 U.S. standard mesh size in a 400 cc. beaker. After the mixture was thoroughly mixed together, it was ground with a mortar and pestle to fine powder form and then placed in a crucible and heated in an oven to 260° C. until it was thoroughly melted, forming a viscous dark brown fluid. The melted mixture was then poured onto a tetrafluoroethylene sheet approximately 0.01" thick to an average depth of about 0.10" and was allowed to cool to solidification in air. The solidified eutectic mixture thus obtained was cut into small pieces (approximately 0.10" in diameter) and then ground to fine powder by 5 passes through a Waring blender. It was then screened and sieved through a mesh screen.

10 grams of the powdered eutectic material obtained as set forth above was then added to 90 grams of cuprous chloride powder (approximately 100 U.S. standard mesh size), the mixture then being ground in a mortar for about 10 minutes until uniformly mixed. At this point the cuprous chloride had an average particle size of 200–300 U.S. standard mesh. 27 grams of this mixture was placed in a clean steel electrode mold having an approximate 3"×3" cavity therein after a piece of expanded copper (5 Cu 15-1/0 Distex) or the like was placed in the cavity for use as a current collector. The active material area density of the electrode material in the finished electrode to be formed in the mold was calculated to be 3 grams per sq. inch. The mold with the mixture and current collector in it was then heated to 275° C. in an oven for approximately 15 minutes until the eutectic had been thoroughly melted, after which the mold was removed from the oven and allowed to cool to room temperature in air which occurred in approximately ½ hour.

The finished electrode was then removed from the mold and examined and was found to have a fused glass-like appearance. Upon testing it was found that the electrode was very strong. The finished electrode has the following dimensions: 2-15/16"×2-15/16". This electrode was then divided into a plurality of separate electrodes. One such electrode was 1"×½"×0.068" and contained 1.5 g. of the cuprous chloride-silver chloride mixture. This msall electrode was used as the positive electrode in an electrochemical cell also containing two magnesium negative electrodes, a separator of cotton felt and an electrolyte of water containing 3.5 weight % of sodium chloride, and performed very satisfactorily therein. The electrolyte was present in an amount of 80 ccs, and the magnesium electrodes each measured 1"×½"×0.011". When the cell was activated and dischared at 1.0 amp per sq. inch, it had a plateau voltage of 0.98 vf. Thus, the cell performed satisfactorily utilizing the cuprous chloride-silver chloride electrode fabricated in accordance with the present method.

EXAMPLE II

The procedure of Example I was followed except that in a first run (A), 2 grams of the eutectic were mixed with 98 grams of the cuprous chloride powder (in place of 10 grams of eutectic and 90 grams of cuprous chloride powder). In a second run (B), 20 grams of the eutectic were mixed with 80 grams of the cuprous chloride powder. In each instance the resulting electrode was used as a positive electrode in an electrochemical cell having the same other components as specified for Example I and performed satisfactorily therein. The electrode of run (A) contained approximately 1% of silver chloride while the electrode of run (B) contained approximately 10% of silver chloride. The electrode of run (A) caused the cell when discharged at 1.0 amps per sq. inch to have a plateau voltage of 0.91 vf while the electrode of run (B) caused the cell when discharged at 1.0 amps per sq. inch to have a plateau voltage of 1.08 vf.

In parallel tests it was demonstrated that the electrodes of runs (A) and (B) as well as the electrode of Example I could be satisfactorily used as positive electrodes in electrochemical cells having sea water as the electrolyte and aluminum or lithium negative electrodes. It was shown in additional tests that nickel and stainless steel current collectors could be successfully substituted for copper current collectors in the cuprous chloride-silver chloride electrode produced in accordance with the present invention.

Various modifications, changes, alterations and additions can be made in the improved method of the present invention, in the steps and in the parameters thereof. All such changes, modifications, alterations and additions as are within the scope of the appended claims form part of the present invention.

What is claimed is:

1. An improved method of making a silver chloride and copper chloride-containing electrode, said method comprising the steps of:
   a. forming a minimum melting point eutectic of silver chloride and cuprous chloride;
   b. heating said eutectic to above the melting point thereof, then cooling, solidifying and powdering said eutectic;
   c. uniformly mixing said eutectic together with additional particulate cuprous chloride to reduce the concentration of silver chloride of the resulting mixture to about 1-10 percent by weight; and, d. forming the resulting mixture into an improved strong electrode.

2. The improved method of claim 1 wherein said eutectic is formed by mixing together about 47 percent by weight of silver chloride and about 53 percent by weight of cuprous chloride and melting the same at least about 255° C.

3. The improved method of claim 2 wherein said molten eutectic is cast, then solidified and ground to fine powder.

4. The improved method of claim 2 wherein said resulting mixture is heated to above the melting point of said eutectic but below the melting point of cuprous chloride, then cooled to solidification to provide said improved strong electrode.

5. The improved method of claim 4 wherein said heating of said resulting mixture takes place in a mold at a temperature not in excess of about 300° C.

* * * * *